United States Patent
Ichikawa

(10) Patent No.: US 10,873,197 B2
(45) Date of Patent: Dec. 22, 2020

(54) VEHICLE WITH DISPLAY FOR SEPARATELY SHOWING GRID BASED SOC AND SOLAR BASED SOC OF VEHICLE BATTERY

(71) Applicant: Toyota Jidosha Kabushiki Kaisha, Toyota (JP)

(72) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 60 days.

(21) Appl. No.: 16/193,619

(22) Filed: Nov. 16, 2018

(65) Prior Publication Data
US 2019/0165589 A1   May 30, 2019

(30) Foreign Application Priority Data

Nov. 24, 2017   (JP) .................. 2017-225969

(51) Int. Cl.
*H02J 7/00* (2006.01)
*B60L 58/12* (2019.01)
*B60L 8/00* (2006.01)
*B60L 53/51* (2019.01)
(Continued)

(52) U.S. Cl.
CPC ............ *H02J 7/0047* (2013.01); *B60L 8/003* (2013.01); *B60L 53/20* (2019.02); *B60L 53/51* (2019.02); *B60L 58/12* (2019.02); *H02J 7/35* (2013.01); *B60L 2210/10* (2013.01); *B60L 2210/30* (2013.01); *B60L 2210/40* (2013.01); *B60L 2230/22* (2013.01); *B60L 2250/16* (2013.01); *H02J 7/0048* (2020.01)

(58) Field of Classification Search
CPC . H02J 7/0047; H02J 7/35; B60L 8/003; B60L 2230/22; B60L 53/20; B60L 58/12; B60L 53/51

USPC ........................................................ 320/101
See application file for complete search history.

(56) References Cited

U.S. PATENT DOCUMENTS

| 5,608,385 A * | 3/1997 | Masaki ................... H02S 50/10 320/101 |
| 5,686,809 A * | 11/1997 | Kimura ................. H02J 7/0013 320/101 |

(Continued)

FOREIGN PATENT DOCUMENTS

| EP | 2175239 A1 | 4/2010 |
| JP | 2011-057116 A | 3/2011 |
| JP | 2013-024680 A | 2/2013 |

*Primary Examiner* — Robert Grant
*Assistant Examiner* — John T Trischler
(74) *Attorney, Agent, or Firm* — Dinsmore & Shohl LLP

(57) ABSTRACT

A vehicle includes a power storage device configured to be charged with electric power supplied from an external electric power installation, and a human machine interface (HMI) device having a display. On the HMI device, a state of charge (SOC) of the power storage device is displayed distinguishably for each derivation of electric power stored in the power storage device. Specifically, on the HMI device, a SOC indicator is displayed for a user to visually recognize the SOC of the power storage device. In the SOC indicator, a solar electric power area indicative of the SOC indicating electric power derived from solar electric power and a grid electric power area indicative of the SOC indicating electric power derived from grid electric power are distinguishably displayed.

8 Claims, 17 Drawing Sheets

(51) Int. Cl.
*B60L 53/20* (2019.01)
*H02J 7/35* (2006.01)

(56) References Cited

U.S. PATENT DOCUMENTS

| | | | | |
|---|---|---|---|---|
| 7,884,569 B2* | 2/2011 | Ward | H02J 7/35 | 320/101 |
| 8,016,604 B2* | 9/2011 | Matsumoto | B60L 3/0069 | 439/304 |
| 8,120,310 B2* | 2/2012 | Littrell | H02J 7/35 | 320/104 |
| 8,203,237 B1* | 6/2012 | Cowles | H02S 20/30 | 307/150 |
| 8,215,963 B2* | 7/2012 | Ichikawa | H01R 13/717 | 439/34 |
| 8,271,053 B2* | 9/2012 | Choi | H02J 7/0047 | 455/573 |
| 8,301,365 B2* | 10/2012 | Niwa | B60L 3/12 | 701/439 |
| 8,326,478 B2* | 12/2012 | Ichikawa | B60L 50/16 | 701/22 |
| 8,441,227 B2* | 5/2013 | Choi | H04M 1/0262 | 320/101 |
| 8,655,414 B2* | 2/2014 | Kim | G06F 1/1635 | 455/566 |
| 8,712,650 B2* | 4/2014 | Koebler | B60K 35/00 | 701/51 |
| 8,768,533 B2* | 7/2014 | Ichikawa | H04L 25/028 | 701/1 |
| 8,972,162 B1* | 3/2015 | Koebler | B60T 1/10 | 701/123 |
| 8,994,326 B2* | 3/2015 | Takada | B60L 53/122 | 320/108 |
| 9,160,193 B2* | 10/2015 | Tonegawa | B60L 53/30 | |
| 9,178,356 B2* | 11/2015 | Bryson | F24F 5/0046 | |
| 9,254,756 B2* | 2/2016 | Miwa | B60L 53/12 | |
| 9,315,109 B2* | 4/2016 | Marathe | B60L 3/0023 | |
| 9,455,574 B2* | 9/2016 | Yanagi | H01M 10/48 | |
| 9,455,597 B2* | 9/2016 | Yang | H02J 7/35 | |
| 9,469,292 B2* | 10/2016 | Hisano | B60W 50/085 | |
| 9,561,733 B2* | 2/2017 | Maeno | B60K 35/00 | |
| 9,597,975 B2* | 3/2017 | Ito | B60L 53/51 | |
| 9,643,589 B2* | 5/2017 | Hokoi | B60W 20/40 | |
| 9,682,624 B1* | 6/2017 | Koebler | B60L 50/62 | |
| 9,855,958 B2* | 1/2018 | Ichikawa | B60W 50/14 | |
| 9,895,993 B2* | 2/2018 | Kishida | B60W 20/13 | |
| 9,981,555 B2* | 5/2018 | Kishida | B60K 35/00 | |
| 10,112,620 B2* | 10/2018 | Matsumoto | B60W 40/12 | |
| 10,131,242 B2* | 11/2018 | Marathe | B60L 3/0023 | |
| 10,232,855 B2* | 3/2019 | Matsumoto | B60W 40/12 | |
| 10,279,800 B2* | 5/2019 | Ichikawa | B60W 20/40 | |
| 10,328,854 B2* | 6/2019 | Ishida | B60L 53/305 | |
| 10,328,930 B2* | 6/2019 | Abe | B60L 53/80 | |
| 10,336,251 B2* | 7/2019 | Ishida | B60Q 1/50 | |
| 2003/0047209 A1* | 3/2003 | Yanai | H02J 3/32 | 136/244 |
| 2008/0094025 A1* | 4/2008 | Rosenblatt | G06F 1/1656 | 320/101 |
| 2008/0143292 A1* | 6/2008 | Ward | B60L 58/12 | 320/101 |
| 2010/0102772 A1* | 4/2010 | Smith | H02J 7/35 | 320/101 |
| 2010/0169008 A1* | 7/2010 | Niwa | B60L 3/12 | 701/532 |
| 2011/0022260 A1* | 1/2011 | Ichikawa | B60W 20/00 | 701/22 |
| 2011/0034053 A1* | 2/2011 | Matsumoto | B60L 3/0069 | 439/304 |
| 2011/0039605 A1* | 2/2011 | Choi | H02J 7/342 | 455/573 |
| 2011/0050416 A1* | 3/2011 | Lee | H01M 10/44 | 340/540 |
| 2011/0055037 A1* | 3/2011 | Hayashigawa | B60L 53/16 | 705/26.1 |
| 2011/0109259 A1* | 5/2011 | Choi | H04M 1/0262 | 320/101 |
| 2011/0133687 A1* | 6/2011 | Kim | H04M 1/21 | 320/101 |
| 2011/0148343 A1* | 6/2011 | Lee | H01M 10/465 | 320/101 |
| 2011/0175569 A1* | 7/2011 | Austin | H01M 10/44 | 320/109 |
| 2011/0207358 A1* | 8/2011 | Ichikawa | H01R 13/717 | 439/345 |
| 2011/0234149 A1* | 9/2011 | Hoshi | B60L 8/003 | 320/101 |
| 2011/0252678 A1* | 10/2011 | Jones | G09F 13/16 | 40/572 |
| 2011/0291608 A1* | 12/2011 | Shimura | H01M 10/488 | 320/101 |
| 2011/0313647 A1 | 12/2011 | Koebler et al. | | |
| 2012/0197452 A1* | 8/2012 | Matthews | H02J 3/008 | 700/292 |
| 2012/0229077 A1* | 9/2012 | Tsuchiya | H02J 3/32 | 320/107 |
| 2012/0310560 A1* | 12/2012 | Ozaki | H02J 13/00001 | 702/62 |
| 2013/0024035 A1* | 1/2013 | Ito | B60L 53/51 | 700/291 |
| 2013/0063085 A1* | 3/2013 | Takada | B60L 53/12 | 320/108 |
| 2013/0077450 A1* | 3/2013 | Fleury | G04B 47/066 | 368/80 |
| 2013/0124005 A1* | 5/2013 | Ichikawa | H04L 25/028 | 701/1 |
| 2013/0141054 A1* | 6/2013 | Tonegawa | H02J 7/00 | 320/162 |
| 2013/0234654 A1* | 9/2013 | Tsuchiya | H01M 10/44 | 320/107 |
| 2013/0314006 A1* | 11/2013 | Lan | B60L 8/003 | 320/101 |
| 2014/0060100 A1* | 3/2014 | Bryson | F24F 5/0046 | 62/235.1 |
| 2014/0062191 A1* | 3/2014 | Bryson | H02J 1/12 | 307/26 |
| 2014/0062206 A1* | 3/2014 | Bryson | H02J 3/385 | 307/80 |
| 2014/0125490 A1* | 5/2014 | Ullrich | B30B 9/321 | 340/870.01 |
| 2014/0163854 A1 | 6/2014 | Matsumoto et al. | | |
| 2014/0300316 A1* | 10/2014 | Miwa | B60L 53/665 | 320/108 |
| 2015/0123619 A1 | 5/2015 | Marathe et al. | | |
| 2015/0158392 A1* | 6/2015 | Zhao | H02J 7/00 | 320/109 |
| 2015/0367746 A1* | 12/2015 | Maeno | B60K 35/00 | 701/22 |
| 2016/0036267 A1* | 2/2016 | Yang | H02J 7/0044 | 320/101 |
| 2016/0047212 A1* | 2/2016 | Vinegar | E21B 43/2401 | 166/250.01 |
| 2016/0193934 A1* | 7/2016 | Marathe | B60L 3/0023 | 320/137 |
| 2016/0243941 A1* | 8/2016 | Kishida | B60K 35/00 | |
| 2016/0243959 A1* | 8/2016 | Kishida | B60K 37/02 | |
| 2016/0272220 A1* | 9/2016 | Ichikawa | B60W 50/14 | |
| 2017/0070842 A1* | 3/2017 | Kulp | H04W 4/021 | |
| 2017/0144673 A1* | 5/2017 | Matsumoto | B60W 50/08 | |
| 2017/0274793 A1 | 9/2017 | Ishibashi et al. | | |
| 2017/0282793 A1* | 10/2017 | Ishida | F21S 41/125 | |
| 2017/0282906 A1* | 10/2017 | Abe | B60L 53/80 | |
| 2018/0056786 A1* | 3/2018 | Koebler | B60W 50/0097 | |
| 2018/0065484 A1* | 3/2018 | Koebler | B60W 10/06 | |
| 2018/0065485 A1* | 3/2018 | Koebler | B60W 50/0097 | |
| 2018/0072157 A1* | 3/2018 | Koebler | B60W 10/06 | |
| 2018/0079304 A1* | 3/2018 | Koebler | B60W 10/11 | |
| 2018/0099564 A1* | 4/2018 | Koebler | B60K 35/00 | |
| 2018/0111481 A1* | 4/2018 | Koebler | G01C 21/3617 | |
| 2018/0118029 A1* | 5/2018 | Koebler | B60L 7/12 | |
| 2018/0118030 A1* | 5/2018 | Koebler | B60L 3/12 | |
| 2018/0126851 A1* | 5/2018 | Koebler | B60W 30/143 | |

(56) References Cited

U.S. PATENT DOCUMENTS

| | | | |
|---|---|---|---|
| 2018/0141449 A1* | 5/2018 | Chen | H02J 7/0047 |
| 2018/0154885 A1* | 6/2018 | Ichikawa | B60W 20/13 |
| 2018/0164121 A1* | 6/2018 | Ichikawa | G07C 5/008 |
| 2018/0236938 A1* | 8/2018 | Ishida | B60L 58/10 |
| 2018/0351214 A1* | 12/2018 | Austin | H01M 10/44 |
| 2019/0054831 A1* | 2/2019 | Marathe | B60L 58/21 |
| 2019/0160962 A1* | 5/2019 | Ichikawa | H02J 3/32 |
| 2020/0204110 A1* | 6/2020 | Yoon | H02S 40/38 |

\* cited by examiner

VEHICLE WITH DISPLAY FOR SEPARATELY SHOWING GRID BASED SOC AND SOLAR BASED SOC OF VEHICLE BATTERY

CROSS-REFERENCE TO RELATED APPLICATIONS

This nonprovisional application claims priority to Japanese Patent Application No. 2017-225969 filed on Nov. 24, 2017 with the Japan Patent Office, the entire contents of which are hereby incorporated by reference.

BACKGROUND

Field

The present disclosure relates to a vehicle including a power storage device configured to be charged with electric power supplied from an external electric power installation.

Description of the Background Art

In recent years, there has been a rapid spread of what is called a plug-in electrically powered vehicle (such as a plug-in hybrid vehicle and an electric vehicle) having a power storage device configured to be charged with electric power supplied from an external electric power installation.

Electric power to be supplied from an electric power installation to a vehicle may include mixed types of electric power obtained in different power generation methods. Examples of the types of electric power include electric power generated with very little emission of greenhouse gases (such as carbon dioxide), such as solar power generation or wind power generation (hereinafter also referred to as "green electric power"); and electric power generated with a lot of emission of greenhouse gases, such as thermal power generation (hereinafter also referred to as "non-green electric power").

A user who is highly interested in preventing global warming and protecting the global environment tends to want to use green electric power to charge a power storage device of his/her vehicle. A vehicle that takes account of such user's need is disclosed in, for example, Japanese Patent Laying-Open No. 2013-24680. This vehicle includes a navigation device that displays a range where the vehicle can travel on green electric power and a range where the vehicle can travel on non-green electric power in rings around the vehicle.

SUMMARY

In the vehicle disclosed in Japanese Patent Laying-Open No. 2013-24680, a range where the vehicle can travel on green electric power is displayed on the navigation device. However, the range where the vehicle can travel may vary depending on the geographical features, the vehicle speed, the traffic conditions, and the like. Therefore, it is disadvantageously difficult for a user to intuitively know the level of green electric power stored in the power storage device of the vehicle.

An object of the present disclosure, which has been made to solve the above problem, is to enable a vehicle user to easily visually recognize the derivation of electric power stored in a power storage device of a vehicle.

(1) A vehicle according to the present disclosure includes: a power storage device configured to be charged with electric power supplied from an external electric power installation; and a display device configured to display a SOC of the power storage device distinguishably for each derivation of electric power stored in the power storage device.

According to the above vehicle, the SOC of the power storage device is displayed on the display device distinguishably for each derivation of electric power stored in the power storage device. Thus, by looking at the display device, a user can visually recognize the derivation of electric power stored in the power storage device of the vehicle.

(2) In a certain embodiment, the display device is configured to distinguishably display: a first SOC area indicating electric power derived from first electric power generated by solar light; and a second SOC area indicating electric power derived from second electric power supplied from a grid power supply. The vehicle further includes a control device configured to control a size of the first SOC area and a size of the second SOC area displayed on the display device.

According to the above embodiment, the control device controls the size of the first SOC area indicating electric power derived from first electric power generated by solar light, and the size of the second SOC area indicating electric power derived from second electric power supplied from a grid power supply. Thus, by checking the size of the first SOC area and the size of the second SOC area displayed on the display device, a user can know the level of the first electric power generated by solar light and the level of the second electric power supplied from the grid power supply stored in the power storage device.

(3) In a certain embodiment, the control device is configured to, in accordance with electric discharge from the power storage device, reduce the size of the first SOC area while maintaining the size of the second SOC area, when a user selects a first display mode in which the first electric power is displayed as being consumed in preference to the second electric power.

According to the above embodiment, in the first display mode, the size of the first SOC area is reduced while the size of the second SOC area is maintained. Such display can make a user feel as if consuming the first electric power generated by solar light in preference to the second electric power supplied from the grid power supply.

(4) In a certain embodiment, the control device is configured to, in accordance with electric discharge from the power storage device, reduce the size of the second SOC area when the first SOC area has been reduced in size and disappeared in accordance with electric discharge from the power storage device, when a user selects the first display mode.

According to the above embodiment, in the first display mode, a user can feel as if consuming the second electric power supplied from the grid power supply after having used up the first electric power generated by solar light preferentially.

(5) In a certain embodiment, the control device is configured to, in accordance with electric discharge from the power storage device, reduce the size of the second SOC area while maintaining the size of the first SOC area, when a user selects a second display mode in which the second electric power is displayed as being consumed in preference to the first electric power.

According to the above embodiment, in the second display mode, the size of the second SOC area is reduced while the size of the first SOC area is maintained. Such display can make a user feel as if consuming the second electric power supplied from the grid power supply in preference.

(6) In a certain embodiment, the control device is configured to, in accordance with electric discharge from the power storage device, reduce the size of the first SOC area and the size of the second SOC area while maintaining a ratio between the size of the first SOC area and the size of the second SOC area, when a user selects a third display mode in which electric power to be displayed as being consumed in preference is not designated.

According to the above embodiment, in the third display mode, the first SOC area is displayed until immediately before the electric power stored in the power storage device is used up. Such display can make a user recognize, until immediately before the electric power stored in the power storage device is used up, that the power storage device was charged with the first electric power generated by solar light.

(7) In a certain embodiment, the electric power installation includes a solar power generator. The vehicle further includes a power conversion device configured to adjust electric power to be supplied from the electric power installation to the power storage device. The control device is configured to, when the power storage device is charged with electric power supplied from the electric power installation, control the power conversion device so that charging electric power for the power storage device is changed in accordance with electric power generated by the solar power generator.

According to the above embodiment, the charging electric power for the power storage device can be increased in accordance with an increase in electric power generated by the solar power generator, and the charging electric power for the power storage device can be decreased in accordance with a decrease in electric power generated by the solar power generator. Therefore, a larger amount of electric power generated by the solar power generator can be taken in the power storage device.

(8) In a certain embodiment, the control device is configured to, when the power storage device is charged with the electric power supplied from the electric power installation, control the power conversion device so that the charging electric power for the power storage device is changed in accordance with the electric power generated by the solar power generator, on condition that a user selects a first charging mode in which the first electric power is used for charging in preference to the second electric power.

According to the above embodiment, a larger amount of electric power generated by the solar power generator can be taken in the power storage device in response to a user request.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
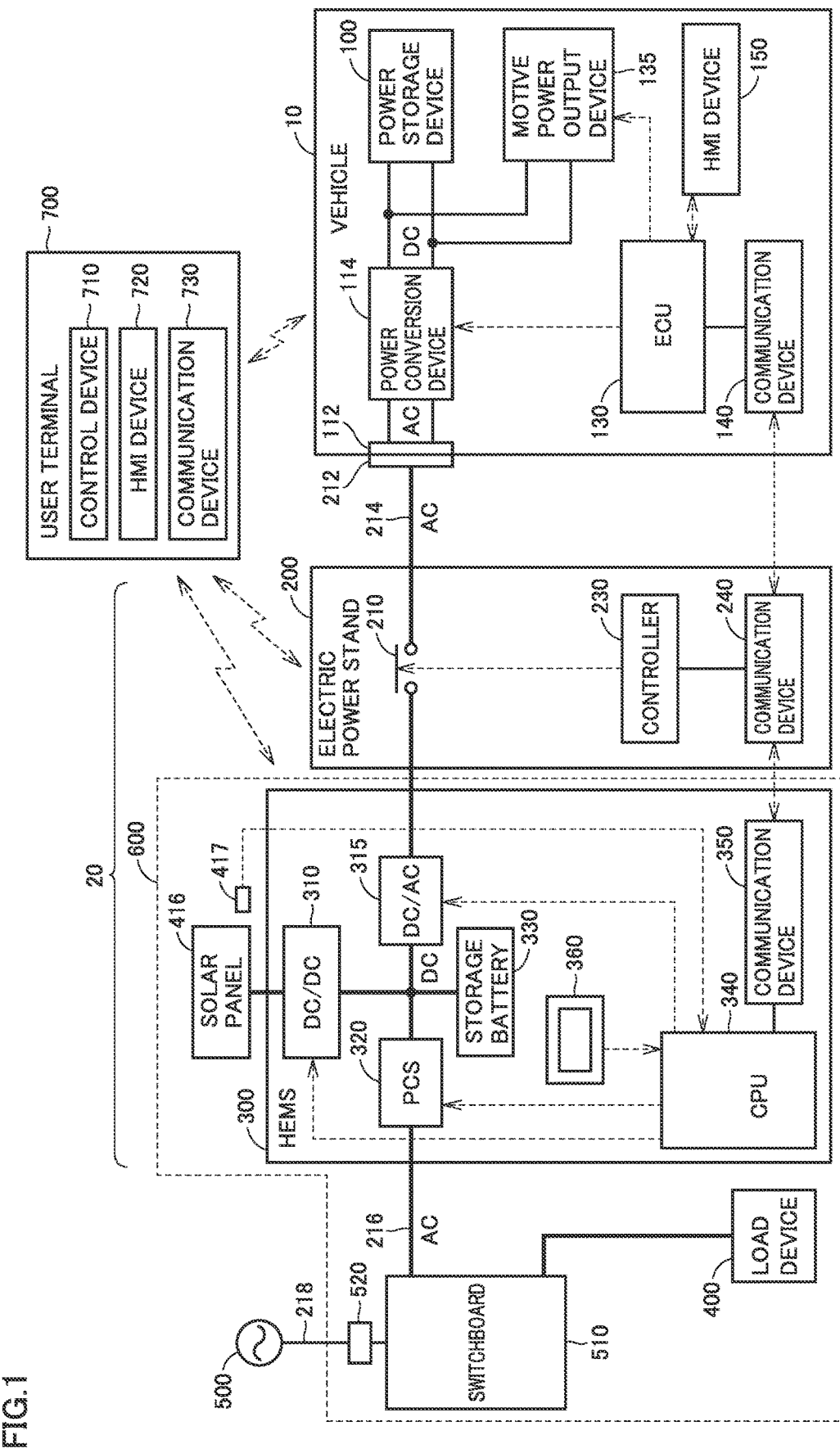
FIG. 1 schematically shows a general configuration of an electric power control system.

Embodiments of the present disclosure are described in detail hereinafter with reference to the drawings. Identical or corresponding parts in the drawings are identically denoted, and the explanation thereof is not repeated.

Throughout the present disclosure, the term "electric power" may mean electric power in a narrow sense (i.e., power) and may also mean electric power in a broad sense (i.e., the amount of electric power or work) or electric energy, and the term is construed flexibly depending on how it is used.

Embodiment 1

<General Configuration>
FIG. 1 schematically shows a general configuration of an electric power control system including a vehicle according to the present embodiment. The electric power control system includes a vehicle 10, an electric power installation 20, a load device 400, a commercial grid power supply 500, a switchboard 510, and a user terminal 700. Electric power installation 20 includes an electric power stand 200, a home energy management system (HEMS) 300, and a solar panel 416. HEMS 300, load device 400, solar panel 416, and switchboard 510 are provided in a house 600.

Vehicle 10 is an electrically powered vehicle capable of producing driving power for travelling by using electric power and capable of transmitting and receiving electric power to and from electric power stand 200. The electrically powered vehicle may have any configuration that allows the vehicle to travel by using electric power. Examples of vehicle 10 include a hybrid vehicle and an electric vehicle.

Vehicle 10 includes a power storage device 100, a connector 112, a power conversion device 114, a motive power output device 135, an electronic control unit (ECU) 130 for controlling the overall operation of vehicle 10, a communication device 140, and human machine interface (HMI) device 150.

Vehicle 10 is capable of charging power storage device 100 with electric power supplied from electric power stand 200. Vehicle 10 is also capable of discharging the electric power in power storage device 100 to electric power stand 200.

Power storage device 100 is a rechargeable electric power storage element, and is representatively implemented as a secondary battery such as a lithium-ion battery or a nickel-metal hydride battery. Alternatively, power storage device 100 may be formed of an electric power storage element other than a battery, such as an electric double layer capacitor.

Connector 112 is configured to be connected to a connector 212 at an end of an electric power cable 214 of electric power stand 200.

Power conversion device 114 is connected between power storage device 100 and connector 112. Power conversion device 114 is controlled by a control signal from ECU 130. When power storage device 100 is to be charged with electric power supplied from electric power stand 200, power conversion device 114 converts the electric power supplied from electric power stand 200 into electric power available to power storage device 100 for charging. When electricity is to be discharged from power storage device 100 to electric power stand 200, power conversion device 114 converts the electric power in power storage device 100 into electric power that can be received by electric power stand 200. Power conversion device 114 is, for example, a bidirectional AC/DC converter.

Motive power output device 135 generates driving power for vehicle 10 by using the electric power stored in power storage device 100. Specifically, motive power output device 135 generates driving power for vehicle 10 based on a driving instruction signal from ECU 130, and outputs the generated driving power to driving wheels (not shown) of vehicle 10. Also, in response to a power generation instruction signal from ECU 130, motive power output device 135 generates electric power and supplies the electric power to power storage device 100.

Communication device 140 is an interface for communicating with a device outside the vehicle (such as electric power stand 200, HEMS 300, and user terminal 700). Communication device 140 is connected to ECU 130 with a communication line, so that communication device 140 sends information communicated from ECU 130 to a device outside the vehicle, and communicates information received from a device outside the vehicle to ECU 130.

HMI device 150 is a device that provides various pieces of information to a user of vehicle 10 and receives operation from a user of vehicle 10. HMI device 150 includes a display with a touch panel, a speaker, and the like.

Further, although not shown, vehicle 10 includes a plurality of sensors for detecting various physical quantities necessary for controlling vehicle 10, such as a vehicle speed sensor for detecting a vehicle speed, and monitoring sensors for detecting the state of power storage device 100 (such as a voltage, an electric current, and a temperature). Each of these sensors outputs the result of detection to ECU 130.

ECU 130 includes built-in central processing unit (CPU) and memory, which are not shown, and controls each device of vehicle 10 based on information stored in the memory and information from each sensor. The control is not limited to processing by software, but can be formed and processed by dedicated hardware (an electronic circuit).

ECU 130 communicates with communication devices 240, 350, and 730 provided in electric power stand 200, HEMS 300, and user terminal 700, respectively, outside the vehicle via communication device 140 in a wired or wireless manner.

As described above, electric power installation 20 includes electric power stand 200, HEMS 300, and solar panel 416. Electric power installation 20 can supply, to vehicle 10 connected to electric power stand 200, at least one of electric power generated by solar panel 416 by using solar energy (hereinafter also referred to as "solar generated electric power" or simply "solar electric power") and electric power from grid power supply 500 (hereinafter also referred to as "grid electric power").

Electric power stand 200 is a facility where vehicle 10 performs charge and discharge. Electric power stand 200 includes electric power cable 214, a relay 210, a controller 230, and communication device 240. Electric power stand 200 is electrically connected to switchboard 510 via HEMS 300. Electric power stand 200 may be provided in house 600.

One end of electric power cable 214 is connected to relay 210, and the other end has connector 212. When electric power is supplied to and received from vehicle 10, connector 212 of electric power cable 214 is connected to connector 112 of vehicle 10, with relay 210 being closed. The opening and closing action of relay 210 is controlled by controller 230.

HEMS 300 is electrically connected to switchboard 510, electric power stand 200, and solar panel 416. HEMS 300 includes a DC/DC converter 310, a DC/AC converter 315, a power conditioning system (PCS) 320, a storage battery 330, a CPU 340, communication device 350, and an operational panel 360.

Solar panel 416 is a solar power generator installed on the roof of house 600 to generate electric power by using solar energy. Solar panel 416 has an electric power sensor 417. Electric power sensor 417 measures electric power (solar electric power) generated by solar panel 416 with solar energy, and outputs the result of measurement to CPU 340.

DC/DC converter 310, DC/AC converter 315, and PCS 320 are controlled by CPU 340.

DC/DC converter 310 is connected to solar panel 416. DC/DC converter 310 converts a DC voltage value of electric power generated by solar panel 416 into an appropriate value.

DC/AC converter 315 is connected to vehicle 10 via electric power stand 200. DC/AC converter 315 converts AC electric power supplied from vehicle 10 via electric power stand 200 into DC electric power, and outputs the DC electric power to PCS 320 and storage battery 330. DC/AC converter 315 converts DC electric power supplied from at least one of DC/DC converter 310, PCS 320, and storage battery 330 into AC electric power, and outputs the AC electric power to vehicle 10 via electric power stand 200.

PCS 320 is connected to grid power supply 500 via switchboard 510 by power cable 216. Grid power supply 500 is representatively formed by a single-phase AC power supply. PCS 320 converts AC electric power supplied from grid power supply 500 via switchboard 510 into DC electric power, and outputs the DC electric power to DC/AC converter 315 and storage battery 330. On the other hand, PCS 320 is capable of converting DC electric power supplied from at least one of DC/DC converter 310, storage battery 330, and DC/AC converter 315 (power storage device 100 of vehicle 10) into AC electric power, and outputting the AC electric power to grid power supply 500 via switchboard 510.

Storage battery 330 is a rechargeable electric power storage element, and is representatively implemented as a secondary battery such as a lithium-ion battery, a nickel-metal hydride battery, or a lead storage battery. Storage battery 330 can be supplied with electric power from vehicle 10, and can also be supplied, via DC/DC converter 310, with electric power generated by solar panel 416 installed on house 600. Further, storage battery 330 can be supplied with electric power from grid power supply 500.

Operational panel 360 is operated by a user of HEMS 300. Operational panel 360 is configured so that a user can select the start and end of supply of electric power to vehicle 10 and the start and end of reception of electric power from vehicle 10. CPU 340 sends an instruction signal according to operation performed by a user via operational panel 360, to controller 230 via communication devices 350, 240. Controller 230 controls relay 210 in response to the instruction signal from CPU 340.

An electric power line 218 connecting grid power supply 500 and switchboard 510 to each other has a breaker 520. Breaker 520 is configured to, when an excessive electric current exceeding an allowable value flows through electric power line 218, break electric power line 218 to disconnect switchboard 510 from grid power supply 500. For example, breaker 520 may be an electric current fuse that fuses when an electric current exceeding an allowable value flows, or may be a device that switches a relay to an open state when an electric current exceeding an allowable value is detected by an electric current sensor or the like.

Load device 400 is any electrical device that operates by receiving electric power from switchboard 510. Load device 400 is, for example, a household electrical appliance for use in house 600.

User terminal 700 is a communication terminal (such as a smartphone) that can be carried by a user of vehicle 10. User terminal 700 includes a control device 710, a HMI device 720, and communication device 730.

HMI device 720 is a device that provides various pieces of information to a user and receives operation from a user. HMI device 720 includes a display with a touch panel.

Communication device 730 is an interface for wirelessly communicating with vehicle 10, electric power stand 200, and HEMS 300.

Control device 710 includes built-in CPU and memory, which are not shown, and controls each device of user terminal 700 (such as HMI device 720 and communication device 730) based on, for example, information stored in the memory and information input to HMI device 720.

<Display of Solar Electric Power Stored in Power Storage Device of Vehicle>

As described above, vehicle 10 is capable of charging power storage device 100 with electric power supplied from electric power installation 20. As described above, electric power supplied from electric power installation 20 to vehicle 10 may include solar electric power (first electric power) and grid electric power (second electric power). The solar electric power is electric power obtained by solar power generation with very little emission of greenhouse gases (such as carbon dioxide). The grid electric power, on the other hand, includes electric power obtained by thermal power generation with a relatively large amount of emission of greenhouse gases.

It is assumed that, for a user who is highly interested in preventing global warming and protecting the global environment, there is a growing need for checking the level of solar electric power in power storage device 100 of his/her own vehicle 10.

In light of such user's need, vehicle 10 according to the present embodiment has a function of displaying, on a display of HMI device 150, a state of charge (SOC) of power storage device 100 distinguishably for each derivation of electric power stored in power storage device 100.

Specifically, when power storage device 100 is charged with electric power supplied from electric power installation 20, ECU 130 of vehicle 10 communicates with electric power installation 20 to obtain electric power derivation identification information (solar electric power or grid electric power) for identifying a derivation of electric power supplied from electric power installation 20, and obtain electric power amount information indicative of the amount of identified electric power supplied. For example, the electric power derivation identification information can be determined by HEMS 300 based on the solar electric power measured by electric power sensor 417.

Based on the electric power derivation identification information and the electric power amount information obtained from electric power installation 20, and further based on the amount of electric discharge from power storage device 100 during travelling of vehicle 10, ECU 130 of vehicle 10 determines the proportions of solar electric power and grid electric power to electric power stored in power storage device 100, and distinguishably displays, on the display of HMI device 150, the SOC indicating electric power derived from solar electric power and the SOC indicating electric power derived from grid electric power in accordance with the determined proportions.

FIG. 2, FIG. 3, FIG. 4, and FIG. 5 respectively show a first setting screen, a second setting screen, a third setting screen, and a SOC display screen which are displayed on HMI device 150 when a user requests that a SOC be displayed. Each image displayed on HMI device 150 is controlled by ECU 130.

Figure 2:
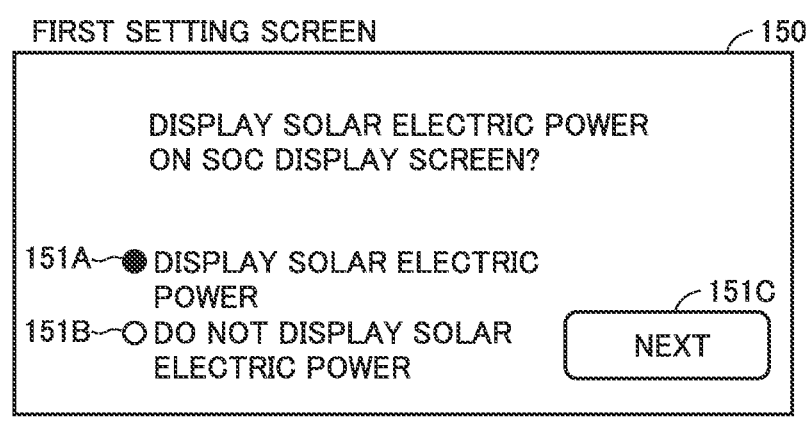
FIG. 2 shows an example of a first setting screen.

FIG. 2 shows an example of the first setting screen. The first setting screen is a screen with which a user can select whether solar electric power will be displayed on the SOC display screen (see FIG. 5 described below). The first setting screen displays a message "Display solar electric power on SOC display screen?", selection buttons 151A, 151B, a next button 151C, and the like.

When a user touches selection button 151A, a setting is made in which solar electric power is displayed on the SOC display screen. When a user touches selection button 151B, a setting is made in which solar electric power is not displayed on the SOC display screen.

When a user touches selection button 151A to make the setting in which solar electric power is displayed and then touches next button 151C, the screen of HMI device 150 is switched from the first setting screen to the second setting screen.

Figure 3:
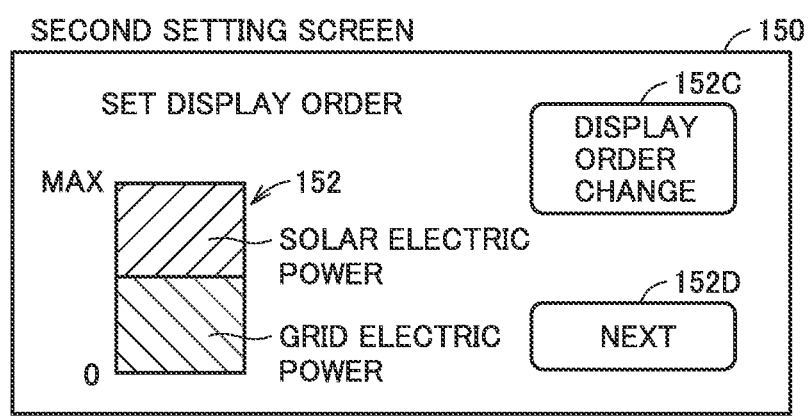
FIG. 3 shows an example of a second setting screen.

FIG. 3 shows an example of the second setting screen. The second setting screen is a screen with which, when solar electric power is to be displayed on the SOC display screen (see FIG. 5 described below), a user can set the display order of the solar electric power. The second setting screen displays a message "Set display order", a SOC sample indicator 152, a display order change button 152C, a next button 152D, and the like.

SOC sample indicator 152 is a sample image of a SOC indicator 154 (see FIG. 5 described below) displayed on the SOC display screen. In the present embodiment, the lower end of SOC sample indicator 152 represents a lower limit of SOC (0%), and the upper end of SOC sample indicator 152 represents a control upper limit MAX of SOC (for example, 100%). FIG. 3 shows a case in which, as an initial setting of the display order, the SOC indicating electric power derived from grid electric power is displayed on the lower side of SOC sample indicator 152 and the SOC indicating electric power derived from solar electric power is displayed on the upper side.

By touching display order change button 152C, a user can change the display order of solar electric power displayed in SOC sample indicator 152. Specifically, when a user touches display order change button 152C, then the initial setting in which solar electric power is displayed above grid electric power is changed to a setting in which solar electric power is displayed below grid electric power, and, in accordance with the change in setting of the display order, the display order of solar electric power in SOC sample indicator 152 is changed. Thus, a user looking at SOC sample indicator 152 can visually check the change in setting of the display order.

When a user touches next button 152D after setting the display order, the screen of HMI device 150 is switched from the second setting screen to the third setting screen.

Figure 4:
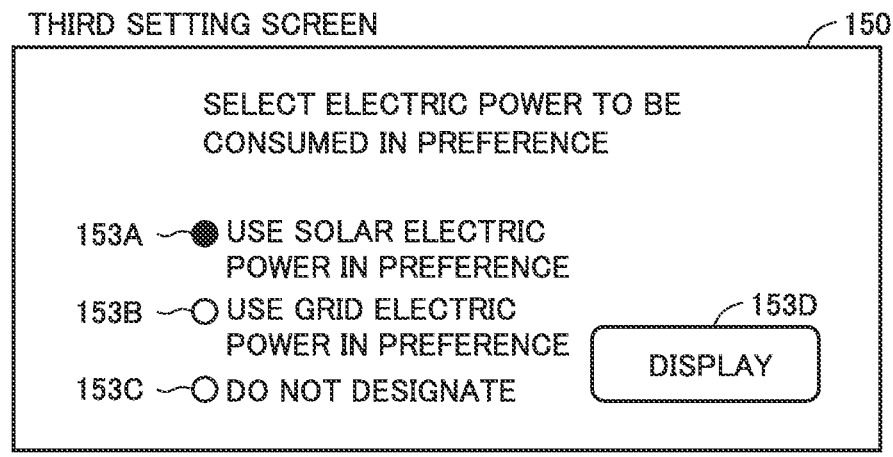
FIG. 4 shows an example of a third setting screen.

FIG. 4 shows an example of the third setting screen. The third setting screen is a screen with which, when solar electric power is to be displayed on the SOC display screen (see FIG. 5 described below), a user can select electric power to be displayed as being consumed in preference. The third setting screen displays a message "Select electric power to be consumed in preference", selection buttons 153A, 153B, 153C, a display button 153D, and the like.

When a user touches selection button 153A, a first display mode is selected in which solar electric power is displayed as being consumed in preference to grid electric power on the SOC display screen.

When a user touches selection button 153B, a second display mode is selected in which grid electric power is displayed as being consumed in preference to solar electric power on the SOC display screen.

When a user touches selection button 153C, a third display mode is selected in which electric power to be consumed in preference is not designated on the SOC display screen.

When a user selects any one of the first to third display modes and then touches display button 153D, the screen of HMI device 150 is switched from the third setting screen to the SOC display screen.

Figure 5:
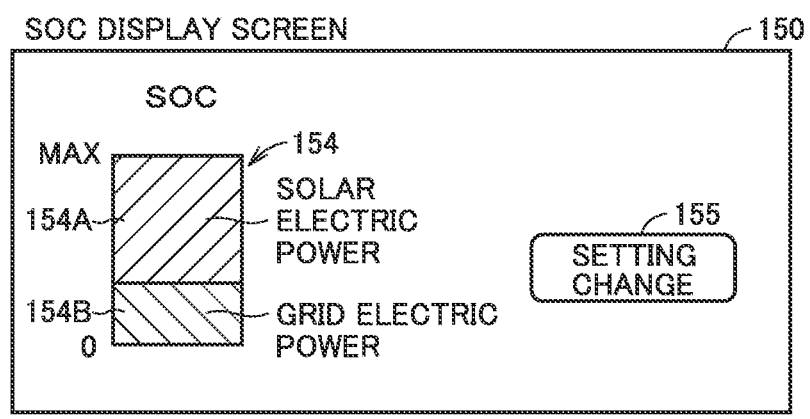
FIG. 5 shows an example of a SOC display screen.

FIG. 5 shows an example of the SOC display screen. The SOC display screen displays SOC indicator 154 and a setting change button 155.

SOC indicator 154 is an image for a user to visually recognize the SOC of power storage device 100. In the present embodiment, the lower end of SOC indicator 154 represents a lower limit of SOC (0%), and the upper end of SOC indicator 154 represents a control upper limit MAX of SOC (for example, 100%). Therefore, the height of SOC indicator 154 represents the full charge capacity of power storage device 100.

In SOC indicator 154, a solar electric power area (first SOC area) 154A indicative of the SOC indicating electric power derived from solar electric power and a grid electric power area (second SOC area) 154B indicative of the SOC indicating electric power derived from grid electric power are vertically arranged and distinguishably displayed with the same width. Thus, the height (size) of solar electric power area 154A corresponds to the SOC indicating electric power derived from solar electric power, the height (size) of grid electric power area 154B corresponds to the SOC indicating electric power derived from grid electric power, and the total height (size) of solar electric power area 154A and grid electric power area 154B corresponds to the total SOC. FIG. 5 shows a case in which grid electric power area 154B is displayed on the lower side of SOC indicator 154 and solar electric power area 154A is displayed on the upper side.

By looking at SOC indicator 154 displayed on the SOC display screen, a user can visually recognize the derivations of electric power stored in power storage device 100. Specifically, a user can know the levels of solar electric power and grid electric power stored in power storage device 100 by checking the heights of solar electric power area 154A and grid electric power area 154B displayed in SOC indicator 154. Thus, a user can feel his/her contribution to the global environment.

If, on the first setting screen (see FIG. 2) described above, a user touches selection button 151B to select no displaying of solar electric power on the SOC display screen, SOC indicator 154 displayed on the SOC display screen simply shows the sum total of solar electric power area 154A and grid electric power area 154B without distinguishing them from each other.

When SOC indicator 154 on the SOC display screen displays solar electric power area 154A and grid electric power area 154B distinguishably, ECU 130 switches the display manner of a changing SOC in accordance with the display mode selected by a user on the third setting screen (see FIG. 4) described above.

Figure 6:
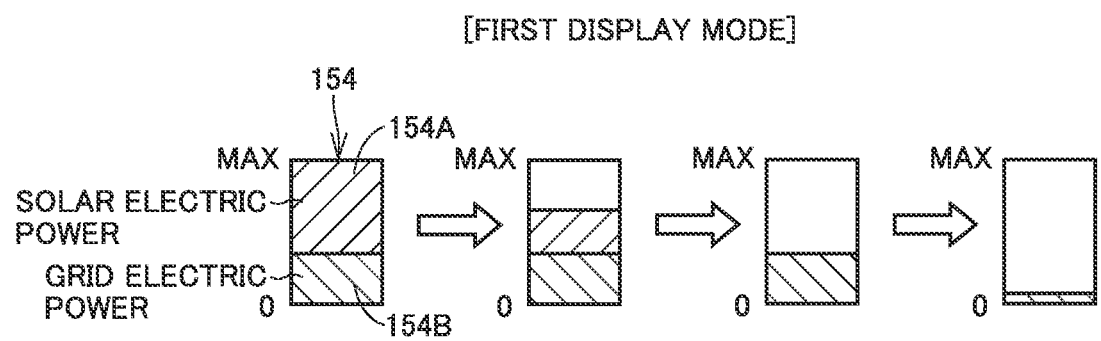
FIG. 6 is a diagram (Part 1) showing an example of the transition of a displayed SOC indicator.
Figure 7:
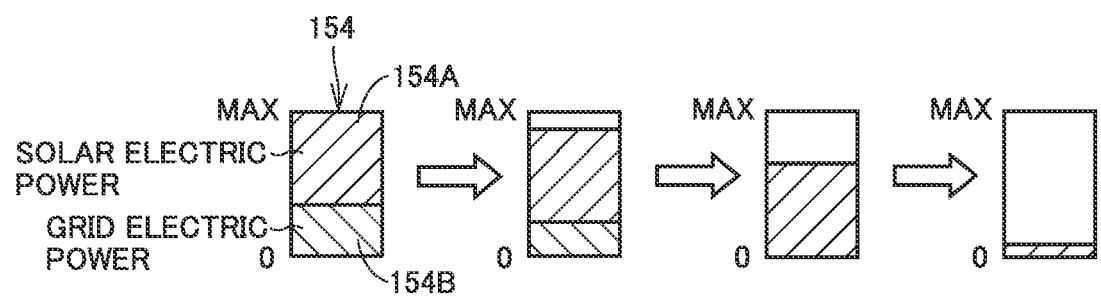
FIG. 7 is a diagram (Part 2) showing an example of the transition of a displayed SOC indicator.
Figure 8:
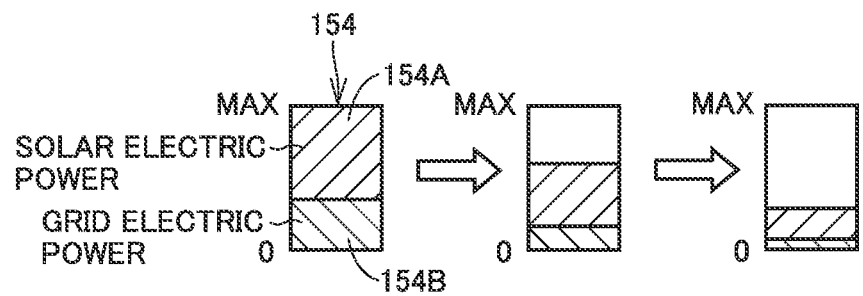
FIG. 8 is a diagram (Part 3) showing an example of the transition of a displayed SOC indicator.

FIG. 6 is a diagram showing an example of the transition of displayed SOC indicator 154 caused by electric discharge from power storage device 100 (decline in SOC) during the first display mode. FIG. 7 is a diagram showing an example of the transition of displayed SOC indicator 154 caused by electric discharge from power storage device 100 (decline in SOC) during the second display mode. FIG. 8 is a diagram showing an example of the transition of displayed SOC indicator 154 caused by electric discharge from power storage device 100 (decline in SOC) during the third display mode. FIGS. 6 to 8 each show a case in which grid electric power area 154B is displayed on the lower side of SOC indicator 154 and solar electric power area 154A is displayed on the upper side.

As shown in FIG. 6, in the first display mode (the display mode in which solar electric power is displayed as being consumed in preference), in accordance with electric discharge from power storage device 100, ECU 130 reduces the height (size) of solar electric power area 154A while maintaining the height (size) of grid electric power area 154B. Thus, a user can feel as if consuming solar electric power in preference to grid electric power. Therefore, a user can more effectively feel his/her contribution to the global environment and can obtain a higher level of satisfaction.

Further, in the first display mode, when solar electric power area 154A has been reduced in height and disappeared in accordance with electric discharge from power storage device 100, ECU 130 reduces the height of grid electric power area 154B in accordance with subsequent electric discharge from power storage device 100. Thus, in the first display mode, a user can feel as if consuming grid electric power after having used up solar electric power preferentially.

As shown in FIG. 7, in the second display mode (the display mode in which grid electric power is displayed as being consumed in preference), in accordance with electric discharge from power storage device 100, ECU 130 reduces the height (size) of grid electric power area 154B while maintaining the height (size) of solar electric power area 154A. This can make a user feel as if consuming grid electric power in preference.

Further, in the second display mode, when grid electric power area 154B has been reduced in height and disappeared in accordance with electric discharge from power storage device 100, ECU 130 reduces the height of solar electric power area 154A in accordance with subsequent electric discharge from power storage device 100.

As shown in FIG. 8, in the third display mode (the display mode in which electric power to be consumed in preference is not designated), in accordance with electric discharge from power storage device 100, ECU 130 reduces the height of solar electric power area 154A and the height of grid electric power area 154B, while maintaining the ratio between the height of solar electric power area 154A and the height of grid electric power area 154B. Accordingly, solar electric power area 154A remains displayed in SOC indicator 154 until immediately before the electric power stored in power storage device 100 is used up. Therefore, until immediately before the electric power stored in power storage device 100 is used up, a user can recognize that power storage device 100 was charged with solar electric power.

As described above, vehicle 10 according to the present embodiment includes power storage device 100 configured to be charged with electric power supplied from external electric power installation 20, and includes HMI device 150 having a display. On HMI device 150, the SOC of power storage device 100 is displayed distinguishably for each derivation of electric power stored in power storage device 100. This allows a user to visually recognize the derivations of electric power stored in power storage device 100 of vehicle 10 by looking at HMI device 150.

Variation 1 of Embodiment 1

Above embodiment 1 describes a case in which the first setting screen, the second setting screen, the third setting screen, and the SOC display screen respectively shown in FIG. 2, FIG. 3, FIG. 4, and FIG. 5 are all displayed on HMI device 150 of vehicle 10.

However, the respective screens shown in FIG. 2 to FIG. 5 may be displayed not only on HMI device 150 of vehicle 10 but also on HMI device 720 of user terminal 700 that communicates with vehicle 10 and electric power installation 20. This allows a user to easily make various settings and confirmations by using his/her own user terminal 700.

Variation 2 of Embodiment 1

Above embodiment 1 describes a case in which the SOC display screen shown in FIG. 5 displays solar electric power area 154A and grid electric power area 154B vertically arranged in SOC indicator 154.

However, the arrangement of solar electric power area 154A and grid electric power area 154B is not limited to the above-described manner. For example, solar electric power area 154A and grid electric power area 154B may be horizontally arranged for display in SOC indicator 154.

Figure 9:
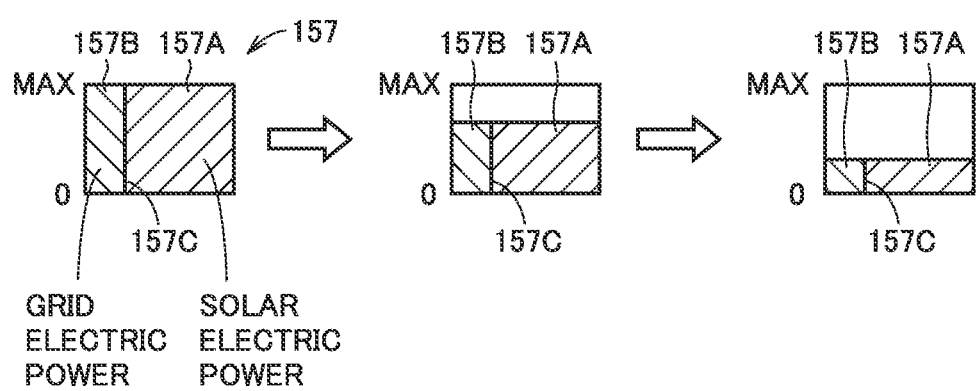
FIG. 9 shows an example of a displayed SOC indicator and the transition thereof.

FIG. 9 shows an example of a displayed SOC indicator 157 and the transition of displayed SOC indicator 157 during the third display mode (the display mode in which electric power to be consumed in preference is not designated), according to the present variation.

The lower end of SOC indicator 157 represents a lower limit of SOC (0%), and the upper end of SOC indicator 157 represents a control upper limit MAX of SOC (for example, 100%).

In SOC indicator 157, a solar electric power area 157A indicative of the SOC indicating electric power derived from solar electric power and a grid electric power area 157B indicative of the SOC indicating electric power derived from grid electric power are horizontally arranged for display with the same height. A boundary line 157C between solar electric power area 157A and grid electric power area 157B relative to the full width of SOC indicator 157 corresponds to a ratio between solar electric power and grid electric power.

In accordance with electric discharge from power storage device 100, ECU 130 equally reduces the height of solar electric power area 157A and the height of grid electric power area 157B without changing the width of solar electric power area 157A and the width of grid electric power area 157B. Accordingly, when the SOC reduces due to electric discharge from power storage device 100, the position of boundary line 157C relative to the full width of SOC indicator 157 is maintained at the same position. This can more effectively make a user feel as if solar electric power and grid electric power are being equally consumed.

Variation 3 of Embodiment 1

Above embodiment 1 describes a case in which two types of derivations of electric power, solar electric power and grid electric power, are distinguishably displayed in SOC indicator 154 on the SOC display screen in FIG. 5.

However, the types of derivations of electric power distinguishably displayed in SOC indicator 154 are not limited to the two types, solar electric power and grid electric power. For example, in addition to solar electric power and grid electric power, electric power generated by motive power output device 135 mounted on vehicle 10 may be distinguishably displayed in SOC indicator 154.

Embodiment 2

In embodiment 1 described above, electric power supplied from electric power installation 20 to vehicle 10 may include solar electric power and grid electric power. It is assumed that, for a user who is highly interested in protecting the global environment, there is a growing need for charging power storage device 100 of his/her own vehicle 10 with solar electric power, not with grid electric power.

In light of such user's need, vehicle 10 according to embodiment 2 has not only a function of displaying the SOC of power storage device 100 distinguishably for each derivation of electric power, but also a function of changing charging electric power for power storage device 100 in accordance with solar electric power when charging power storage device 100 of vehicle 10 with electric power supplied from electric power installation 20. The other structure, function, and processing are the same as those of embodiment 1 described above, and thus the detailed explanation of them is not repeated here.

Figure 10:
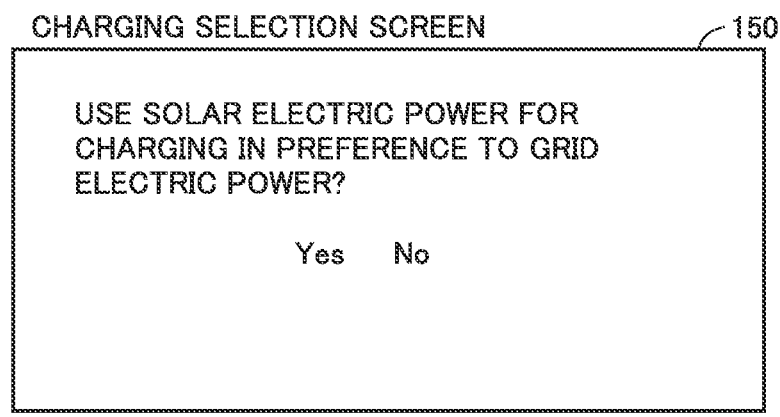
FIG. 10 shows an example of a charging selection screen.

FIG. 10 shows an example of a charging selection screen displayed on HMI device 150 of vehicle 10. The charging selection screen is a screen with which a user can select whether to use solar electric power in preference for charging. The charging selection screen displays a message "Use solar electric power for charging in preference to grid electric power?", a YES button, a NO button, and the like.

When a user touches the YES button appearing on the charging selection screen, a "solar charging mode" is selected in which solar electric power is used for charging in preference to grid electric power. When a user touches the NO button appearing on the charging selection screen, a "normal mode" is selected in which electric power to be used for charging in preference is not designated. The result of selection by a user is stored in a memory of ECU 130.

Figure 11:
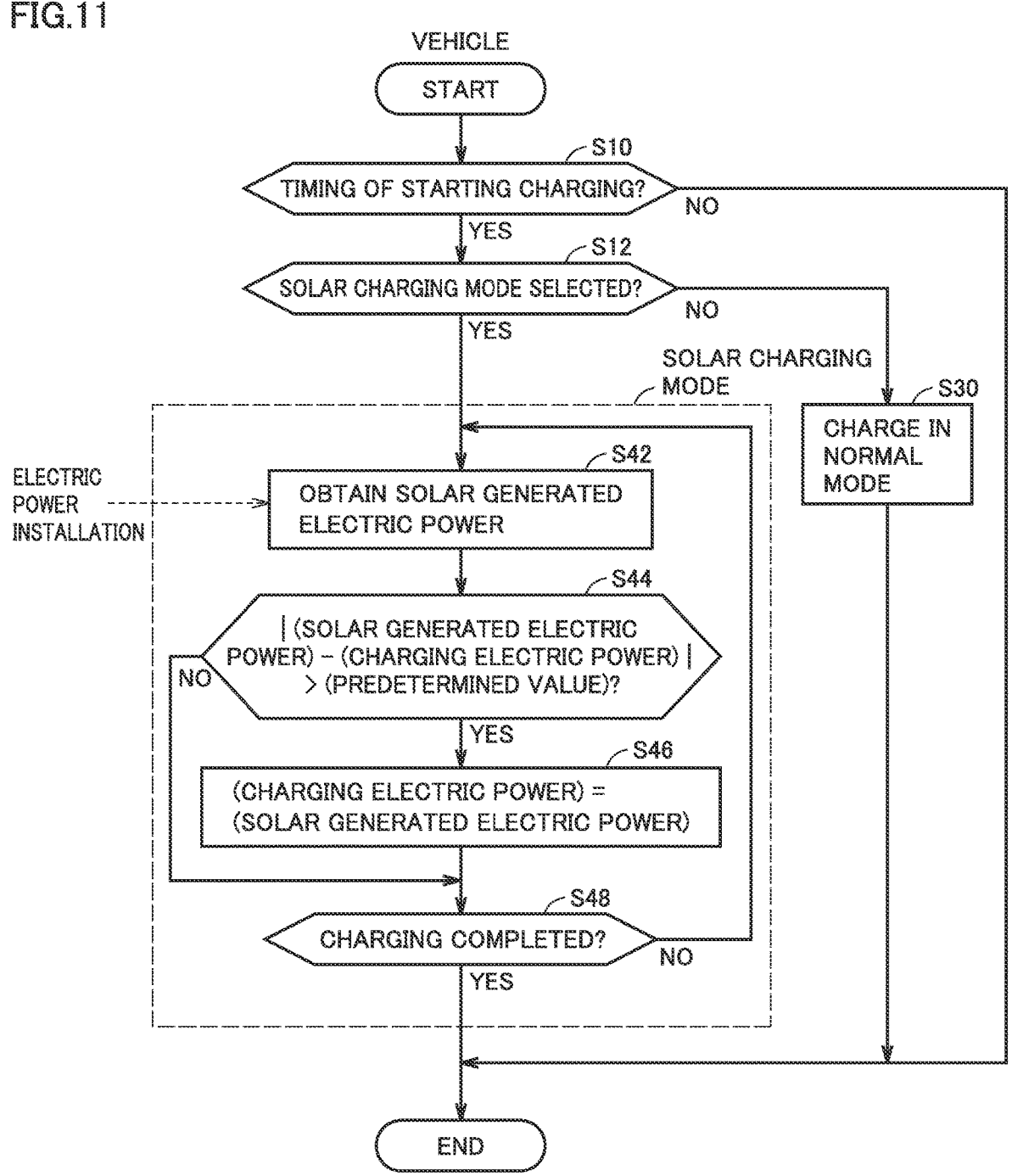
FIG. 11 is a flowchart (Part 1) showing an example of a procedure performed by an ECU of a vehicle.

FIG. 11 is a flowchart showing an example of a procedure performed by ECU 130 of vehicle 10 when power storage device 100 is charged with electric power supplied from electric power installation 20.

ECU 130 determines whether or not it is a timing of starting charging power storage device 100 by electric power installation 20 (step S10). If it is not a timing of starting charging (NO at step S10), ECU 130 skips the subsequent steps and ends the processing.

If it is a timing of starting charging (YES at step S10), ECU 130 displays the charging selection screen shown in FIG. 10 described above and determines whether or not the solar charging mode has been selected by a user (step S12).

If the solar charging mode has not been selected (NO at step S12), ECU 130 charges power storage device 100 in the normal mode (step S30). For example, ECU 130 sets charging electric power for power storage device 100 to a predetermined fixed value, and controls power conversion device 114 to charge power storage device 100 with the set charging electric power.

If, on the other hand, the solar charging mode has been selected (YES at step S12), ECU 130 charges power storage device 100 in the solar charging mode (steps S42 to S48).

Specifically, ECU 130 first obtains, from electric power installation 20, information on the current solar generated electric power (step S42). ECU 130 then determines whether or not the difference (absolute value) between the current solar generated electric power and the charging electric power for power storage device 100 exceeds a predetermined value (step S44). The predetermined value is set to a very low value.

If the difference exceeds the predetermined value (YES at step S44), ECU 130 changes the charging electric power for power storage device 100 to the current solar generated electric power (step S46). That is, ECU 130 sets the charging electric power for power storage device 100 to the same value as the current solar generated electric power, and controls power conversion device 114 to charge power storage device 100 with the set charging electric power. ECU 130 then shifts the processing to step S48.

If the difference does not exceed the predetermined value (NO at step S44), ECU 130 shifts the processing to step S48 while maintaining the charging electric power for power storage device 100 at the current value.

Subsequently, ECU 130 determines whether or not the charging of power storage device 100 has completed (whether or not the SOC has reached a target value) (step S48). If the charging has not completed (NO at step S48), ECU 130 returns the processing to step S42, and repeats step S42 and the subsequent steps until the charging completes. If the charging has completed (YES at step S48), ECU 130 ends the processing.

Figure 12:
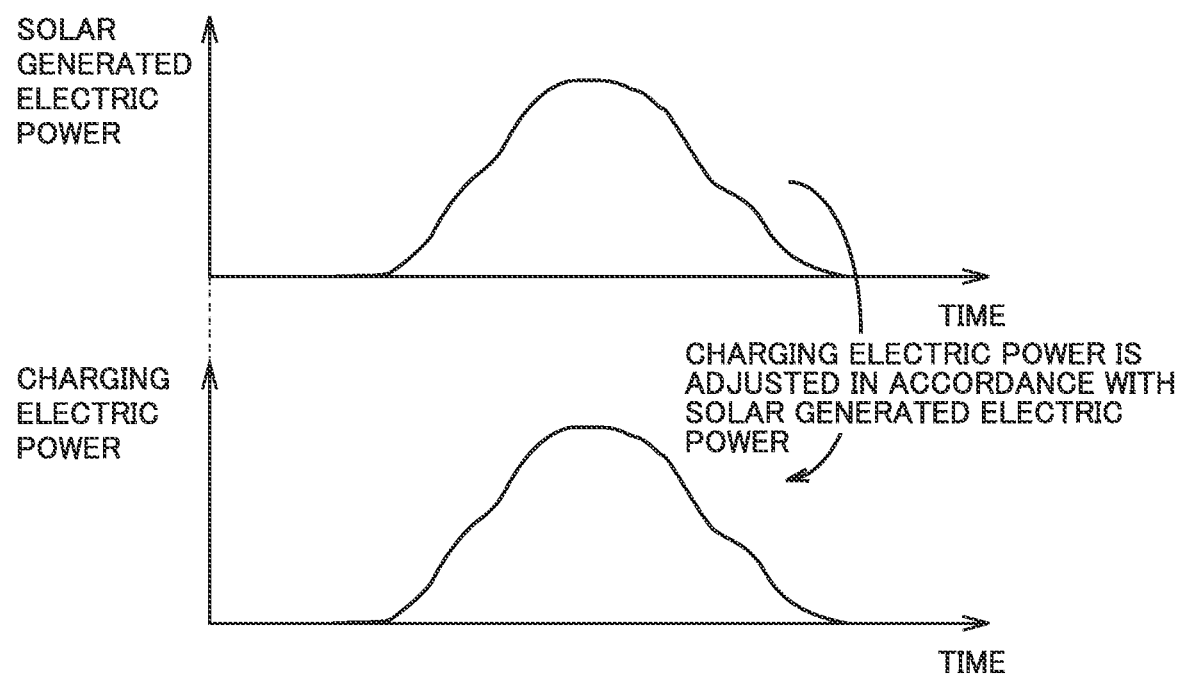
FIG. 12 is a diagram (Part 1) showing an example of the change in solar generated electric power and the change in charging electric power for a power storage device.

FIG. 12 is a diagram showing an example of the change in solar generated electric power and the change in charging electric power for power storage device 100 when power storage device 100 is charged in the solar charging mode. As shown in FIG. 12, in the solar charging mode, the charging electric power for power storage device 100 is adjusted to be substantially the same as the solar generated electric power. That is, in accordance with an increase in solar generated electric power, the charging electric power for power storage device 100 is increased so as to follow the solar generated electric power; and in accordance with a decrease in solar generated electric power, the charging electric power for power storage device 100 is decreased so as to follow the solar generated electric power.

On calculation, therefore, all the solar electric power as generated is charged to power storage device 100. Accordingly, a larger amount of solar electric power can be taken in power storage device 100.

The selection of the solar charging mode described above is made by a user. Therefore, a larger amount of solar electric power can be taken in power storage device 100 in response to a user request. This satisfies the need for a user to use solar electric power for charging power storage device 100.

Variation 1 of Embodiment 2

The processing in the flowchart in FIG. 11 described above may be performed by CPU 340 of HEMS 300 of electric power installation 20 while CPU 340 is communicating with vehicle 10.

Figure 13:
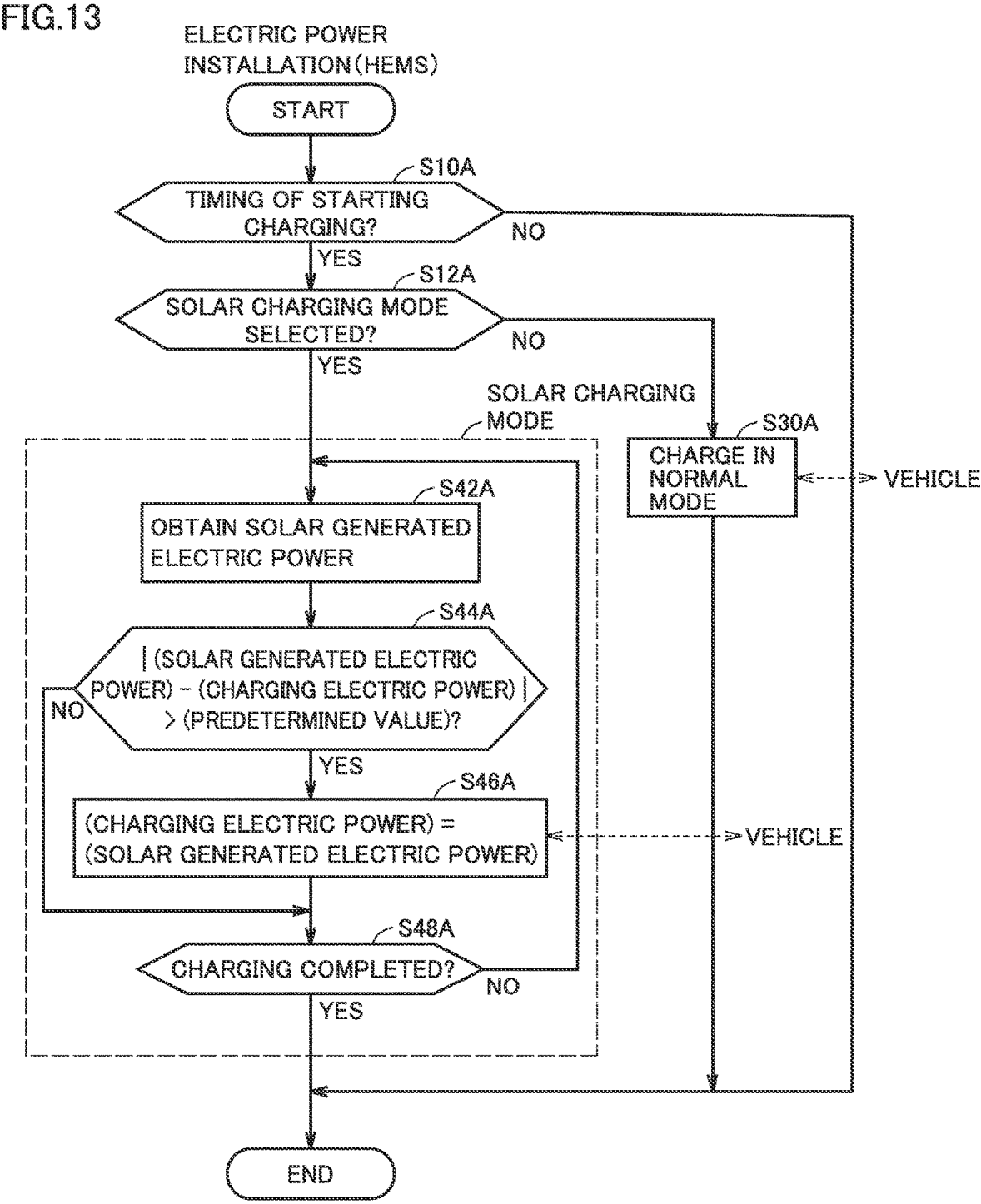
FIG. 13 is a flowchart showing an example of a procedure performed by a CPU of a HEMS.

FIG. 13 is a flowchart showing an example of a procedure performed by CPU 340 of HEMS 300 when power storage device 100 is charged with electric power supplied from electric power installation 20. Steps S10A to S48A shown in the flowchart in FIG. 13 respectively correspond to steps S10 to S48 shown in the flowchart in FIG. 11 above.

That is, if it is a timing of starting charging (YES at step S10A), HEMS 300 communicates with vehicle 10 and determines whether or not the solar charging mode has been selected (step S12A). It the solar charging mode has not been selected (NO at step S12A), HEMS 300 communicates with vehicle 10 and charges power storage device 100 in the normal mode (step S30A).

If, on the other hand, the solar charging mode has been selected (YES at step S12A), HEMS 300 communicates with vehicle 10 and charges power storage device 100 in the solar charging mode (steps S42A to S48A).

In this way, HEMS 300 may charge power storage device 100 in the solar charging mode while communicating with vehicle 10.

Variation 2 of Embodiment 2

When power storage device 100 is charged in the solar charging mode, an upper limit and a lower limit may be set on the charging electric power for power storage device 100.

Figure 14:
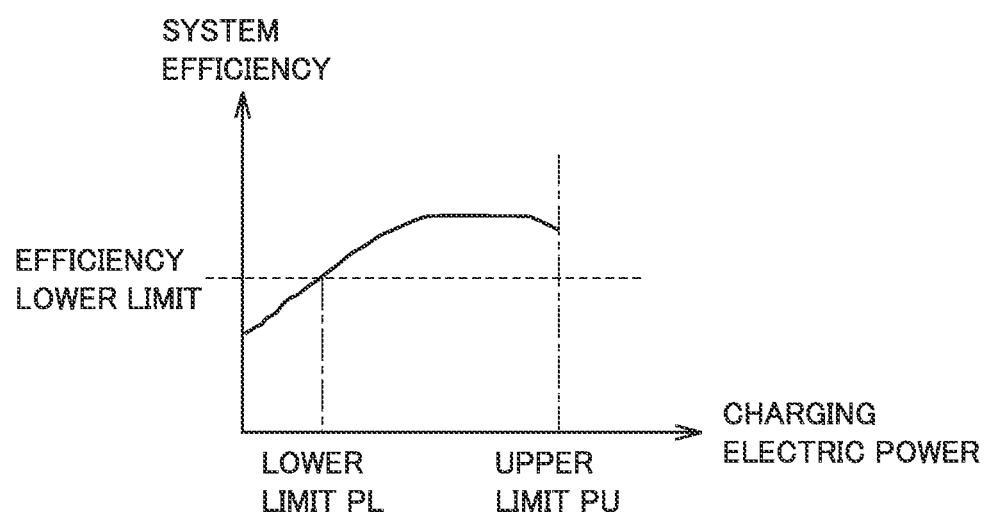
FIG. 14 shows an example of the relation between the charging electric power for a power storage device and the system efficiency.

FIG. 14 shows an example of the relation between the charging electric power for power storage device 100 and the efficiency of the overall charging system (hereinafter also simply referred to as "system efficiency") when power storage device 100 is charged with electric power supplied from electric power installation 20. In a range where the charging electric power for power storage device 100 is low, the system efficiency tends to become lower as the charging electric power becomes lower. In the present variation, the charging electric power for power storage device 100 for which the system efficiency is at the efficiency lower limit is set to a lower limit PL of the charging electric power for power storage device 100. Further, by considering that actual charging is performed by power conversion device 114, an upper limit PU of the charging electric power for power storage device 100 is determined according to the specifications (e.g. output upper limit) of power conversion device 114.

Figure 15:
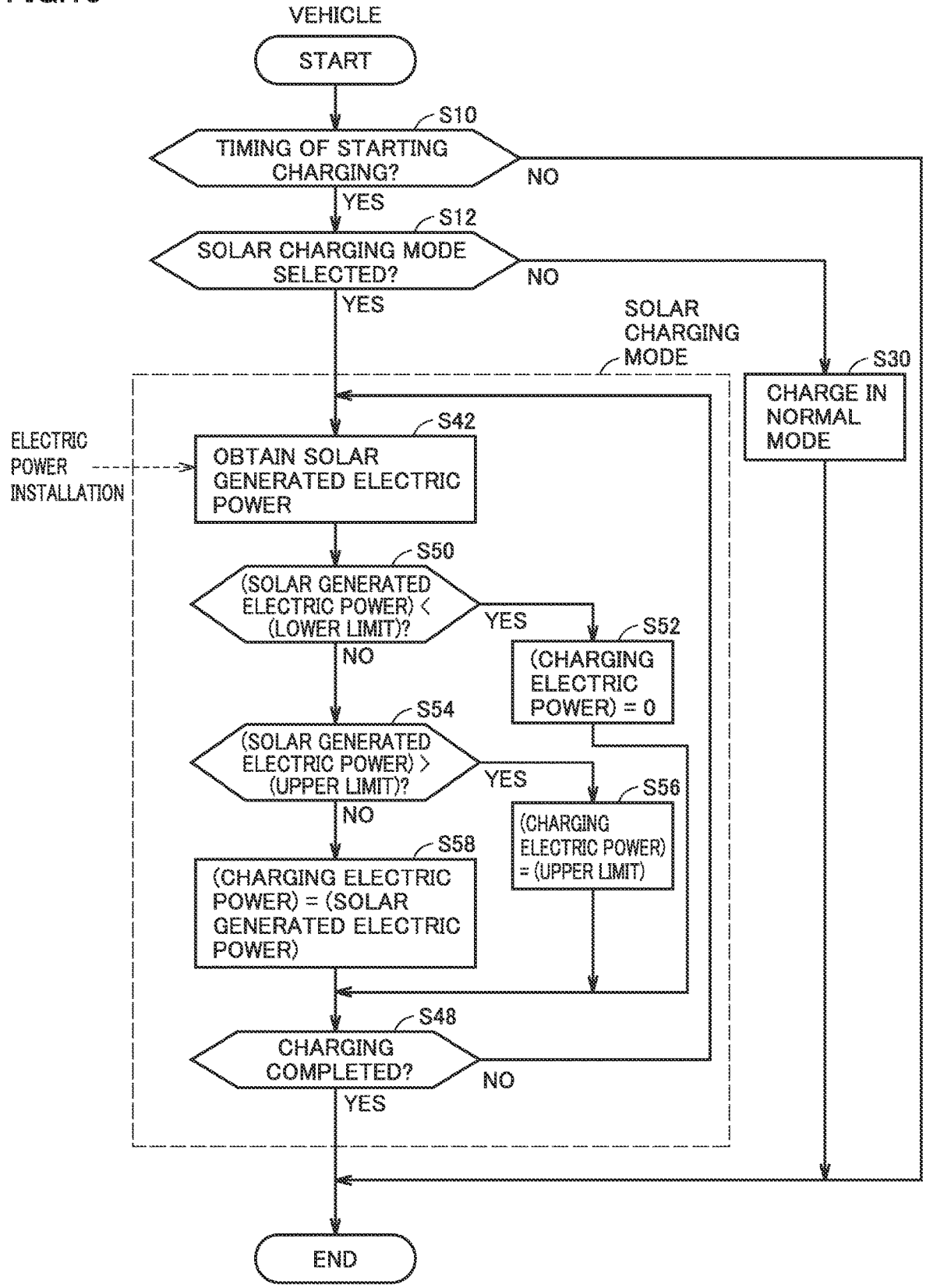
FIG. 15 is a flowchart (Part 2) showing an example of a procedure performed by an ECU of a vehicle.

FIG. 15 is a flowchart showing an example of a procedure performed by ECU 130 of vehicle 10 according to the present variation when power storage device 100 is charged with electric power supplied from electric power installation 20. The flowchart in FIG. 15 corresponds to the flowchart in FIG. 11, with steps S44 and S46 being changed to steps S50 to S58. The other steps (the steps denoted by the same numbers as the steps shown in FIG. 11 above) have already been described, and thus the detailed explanation of them is not repeated here.

In the solar charging mode, ECU 130 determines whether or not the current solar generated electric power obtained from electric power installation 20 is less than lower limit PL of the charging electric power (step S50). If the current solar generated electric power is less than lower limit PL (YES at step S50), ECU 130 controls power conversion device 114 so that the charging electric power for power storage device 100 will be "0" (step S52). That is, ECU 130 does not charge power storage device 100.

If the current solar generated electric power is not less than lower limit PL (NO at step S50), ECU 130 determines whether or not the current solar generated electric power exceeds upper limit PU of the charging electric power (step S54). If the solar generated electric power exceeds upper limit PU (YES at step S54), ECU 130 controls power conversion device 114 so that the charging electric power for power storage device 100 will be upper limit PU (step S56).

If the current solar generated electric power does not exceed upper limit PU (NO at step S54), ECU 130 controls power conversion device 114 so that the charging electric power for power storage device 100 will be the current solar generated electric power (step S58).

Figure 16:
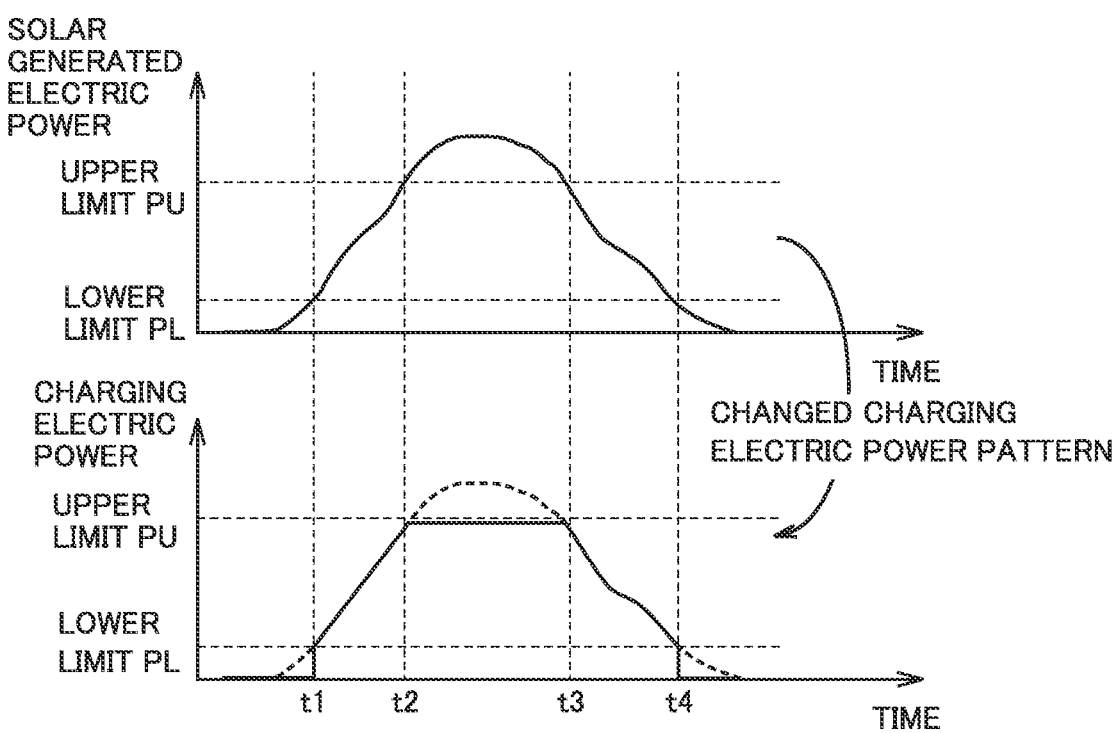
FIG. 16 is a diagram (Part 2) showing an example of the change in solar generated electric power and the change in charging electric power for a power storage device.

FIG. 16 is a diagram showing an example of the change in solar generated electric power and the change in charging electric power for power storage device 100 when power storage device 100 is charged in the solar charging mode according to the present variation.

As shown in FIG. 16, during a time period in which the solar generated electric power exceeds upper limit PU (time t2 to time t3), the charging electric power for power storage device 100 is limited to upper limit PU. During a time period in which the solar generated electric power is less than lower limit PL (before time t1 and after time t4), charging of power storage device 100 is not performed so as to prevent reduction in system efficiency.

In this way, when power storage device 100 is charged in the solar charging mode, lower limit PL and upper limit PU may be set on the charging electric power for power storage device 100 in view of, for example, the system efficiency. This allows power storage device 100 to be efficiently charged with solar generated electric power.

Variation 3 of Embodiment 2

Solar generated electric power may also be consumed by load device 400 used in house 600. It is assumed that a user desires to consume solar generated electric power for load device 400 in house 600, without consuming grid electric power.

In view of such a desire, when power storage device 100 is charged in the solar charging mode, power storage device 100 may be charged with the electric power obtained by subtracting the power consumption of load device 400 from the solar generated electric power (hereinafter also referred to as "solar surplus electric power").

Figure 17:
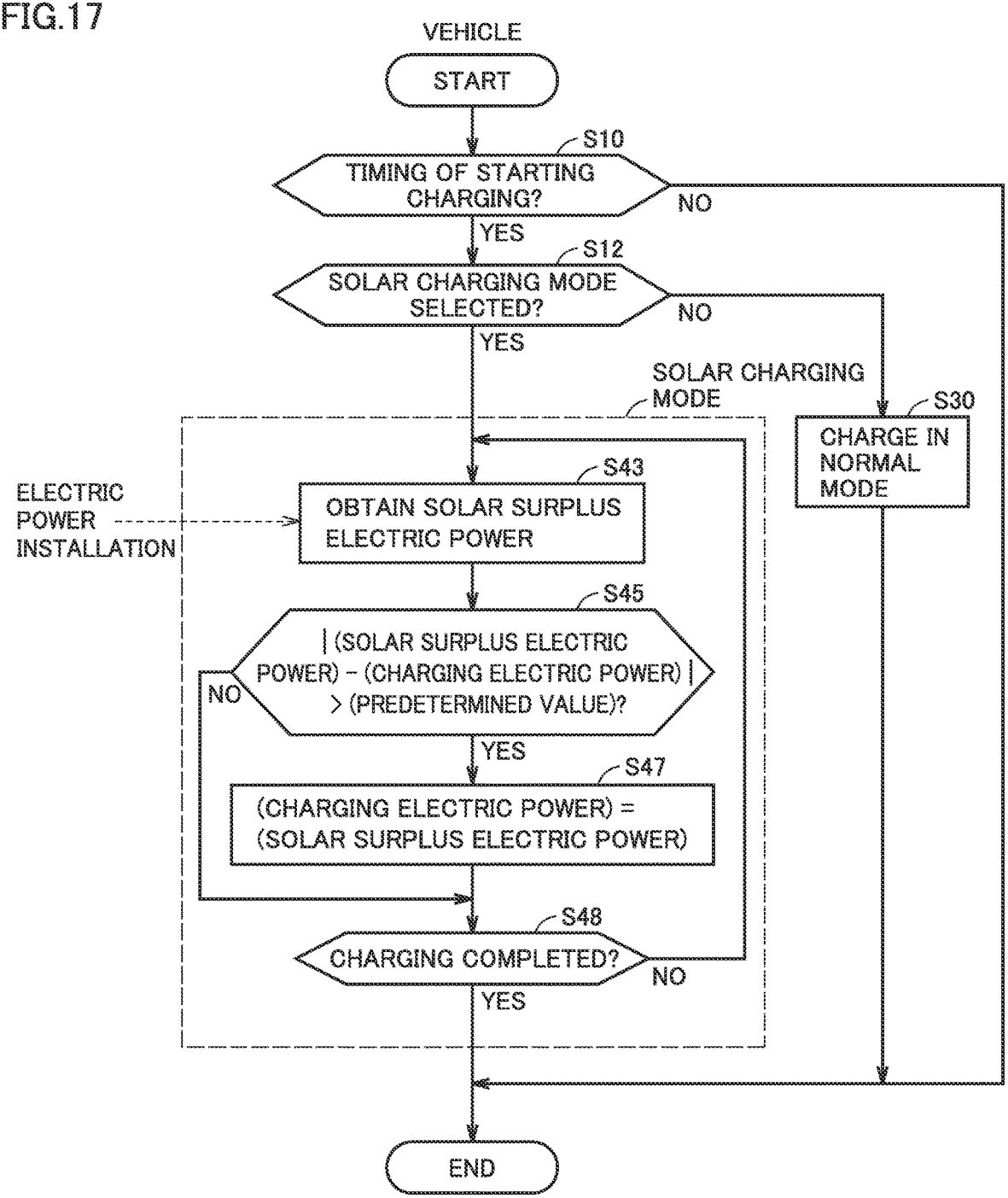
FIG. 17 is a flowchart (Part 3) showing an example of a procedure performed by an ECU of a vehicle.

FIG. 17 is a flowchart showing an example of a procedure performed by ECU 130 of vehicle 10 according to the present variation when power storage device 100 is charged with electric power supplied from electric power installation 20. The flowchart in FIG. 17 corresponds to the flowchart in FIG. 11, with steps S42, S44, and S46 being changed to steps S43, S45, and S47, respectively. The other steps (the steps denoted by the same numbers as the steps shown in FIG. 11 above) have already been described, and thus the detailed explanation of them is not repeated here.

In the solar charging mode, ECU 130 obtains, from electric power installation 20, information on the current solar surplus electric power (step S43). ECU 130 then determines whether or not the difference (absolute value) between the current solar surplus electric power and the charging electric power for power storage device 100 exceeds a predetermined value (step S45).

If the difference exceeds the predetermined value (YES at step S45), ECU 130 changes the charging electric power for power storage device 100 to the current solar surplus electric power (step S47). ECU 130 then shifts the processing to step S48.

If the difference does not exceed the predetermined value (NO at step S45), ECU 130 shifts the processing to step S48 while maintaining the charging electric power for power storage device 100 at the current value.

In this way, when power storage device 100 is charged in the solar charging mode, load device 400 in house 600 can also consume solar generated electric power without consuming grid electric power.

Embodiment 1, variations 1 to 3 of embodiment 1, embodiment 2, and variations 1 to 3 of embodiment 2 described above can be combined as appropriate if technically compatible.

Although embodiments of the present disclosure have been described, it should be construed that the embodiments disclosed herein are by way of illustration in every respect and are not to be taken by way of limitation. The scope of the present disclosure is defined by the terms of the claims and is intended to include any modification within the meaning and scope equivalent to the terms of the claims.

What is claimed is:
1. A vehicle comprising:
a power storage device configured to be charged with first electric power and second electric power supplied from an external electric power installation, the first electric power is generated by solar light and the second electric power is supplied from a grid power supply connected to the external electric power installation,
a display device configured to display a SOC of the power storage device; and
a control device configured to obtain electric power derivation identification information for identifying a derivation of electric power supplied from the external electric power installation, and electric power amount information indicative of an amount of identified electric power supplied,
wherein the control device is configured to determine proportions of the first electric power and the second electric power to electric power stored in the power storage device on a basis of the electric power derivation identification information and the electric power amount information obtained from the external power installation and an amount of electric discharge from the power storage device during travelling of the vehicle,
wherein the control device is configured to distinguishably display, on the display device, a first SOC area indicating electric power derived from the first electric power and a second SOC area indicating electric power derived from the second electric power in accordance with the determined proportions.

2. The vehicle according to claim 1, wherein the control device is configured to, on the basis of the amount of electric discharge from the power storage device, reduce the size of the second SOC area while maintaining the size of the first SOC area, when a user selects a display mode in which the second electric power is displayed as being consumed in preference to the first electric power.

3. The vehicle according to claim 1, wherein the control device is configured to, on the basis of the amount of electric discharge from the power storage device, reduce the size of the first SOC area and the size of the second SOC area while maintaining a ratio between the size of the first SOC area and the size of the second SOC area, when a user selects a display mode in which electric power to be displayed as being consumed in preference is not designated.

4. The vehicle according to claim 1, wherein
the external electric power installation includes a solar power generator,
the vehicle further comprises a power conversion device configured to adjust charging electric power to be supplied from the external electric power installation to the power storage device, and
the control device is configured to, when the power storage device is charged with electric power supplied from the external electric power installation, control the power conversion device so that the charging electric power for the power storage device is adjusted to be the same as the electric power generated by the solar power generator.

5. The vehicle according to claim 4, wherein the control device is configured to, when the power storage device is charged with the charging electric power supplied from the external electric power installation, control the power conversion device so that the charging electric power for the power storage device is adjusted to be the same as the electric power generated by the solar power generator, on condition that a user selects a first charging mode in which the first electric power is used for charging in preference to the second electric power.

6. The vehicle according to claim 1, wherein the control device is configured to, on a basis of an amount of electric discharge from the power storage device, reduce the size of the first SOC area while maintaining the size of the second SOC area, when a user selects a first display mode in which the first electric power is displayed as being consumed in preference to the second electric power.

7. The vehicle according to claim 6, wherein the control device is configured to, on the basis of the amount of electric discharge from the power storage device, reduce the size of the second SOC area when the first SOC area has been reduced in size and disappeared in accordance with electric discharge from the power storage device, when the user selects the first display mode.

8. The vehicle according to claim 6, wherein
the external electric power installation includes a solar power generator,
the vehicle further comprises a power conversion device configured to adjust charging electric power to be supplied from the external electric power installation to the power storage device, and
the control device is configured to, when the power storage device is charged with electric power supplied from the external electric power installation, control the power conversion device so that the charging electric power for the power storage device is adjusted to be the same as the electric power obtained by subtracting a power consumption of a load device in a house from the electric power generated by the solar power generator.

* * * * *